US008576430B2

(12) United States Patent
Balduccini (10) Patent No.: US 8,576,430 B2
(45) Date of Patent: Nov. 5, 2013

(54) JOB SCHEDULE GENERATION USING HISTORICAL DECISION DATABASE

(75) Inventor: Marcello Balduccini, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 561 days.

(21) Appl. No.: 12/869,971

(22) Filed: Aug. 27, 2010

(65) Prior Publication Data

US 2012/0050787 A1   Mar. 1, 2012

(51) Int. Cl.
*G06F 3/12* (2006.01)
*G06K 15/00* (2006.01)

(52) U.S. Cl.
USPC ......... 358/1.15; 358/1.1; 358/1.13; 358/1.14; 358/1.18

(58) Field of Classification Search
None
See application file for complete search history.

(56) References Cited

U.S. PATENT DOCUMENTS

| | | | | |
|---|---|---|---|---|
| 5,465,308 | A * | 11/1995 | Hutcheson et al. | 382/159 |
| 2003/0195917 | A1 * | 10/2003 | Horiyama et al. | 709/102 |
| 2005/0243365 | A1 * | 11/2005 | Noda | 358/1.15 |
| 2008/0178187 | A1 * | 7/2008 | Altshuler et al. | 718/104 |
| 2010/0097653 | A1 * | 4/2010 | Rai et al. | 358/1.15 |

FOREIGN PATENT DOCUMENTS

EP     1 696 310     8/2006

OTHER PUBLICATIONS

M. Davis et al. "A computing procedure for quantification theory," Communications of the ACM, vol. 7, pp. 201-215 (1960).
M. Davis et al. "A machine program for theorem proving," Communications of the ACM, vol. 5, pp. 394-397 (1962).
P. Simons et al. "Extending and implementing the stable model semantics" Artificial Intelligence, vol. 138, pp. 181-234 (2002).
M. Gelfond et al., "Classical negation in logic programs and disjunctive databases," New Generation Computing, vol. 9, pp. 365-385 (1991).
M. Denecker et al., "The Second Answer Set Programming Competition," Proceedings of the 10th International Conference on Logic Programming and Nonmonotonic Reasoning, pp. 637-654 (2009).
M. Balduccini et al., "Answer Set Based Design of Knowledge Systems," Annals of Mathematics and Artificial Intelligence, vol. 47, pp. 183-219 (2006).
Lifschitz et al.: "Answer set programming and plan generation", Artificial Intelligence, Elsevier Science Publisher B.V., Amsterdam, NL, vol. 138, No. 1-2, Jun. 1, 2002, pp. 39-54, XP027213770, ISSN: 0004-3702 [retrieved on Jun. 1, 2002] the whole document.
Dovier et al., "An Empirical Study of Constraint Logic Programming and Answer Set Programming Solutions of Combinatorial Problems," Journal of Experimental & Theoretical Artificial Intelligence, vol. 21(2), pp. 79-121 (2009).

* cited by examiner

*Primary Examiner* — Satwant Singh
(74) *Attorney, Agent, or Firm* — Kevin E. Spaulding (57) ABSTRACT

A method for determining a print job schedule for a printing production facility having a set of availably printing resources, comprising: defining one or more scheduling classifications; receiving one or more print jobs, each print job having a print job description specified by a set of print job attributes; determining one or more scheduling classification corresponding to the received print jobs; using a processor to automatically determine the print job schedule for the received print jobs using an answer set programming language solver responsive to the print job descriptions, a set of resource descriptions, a set of scheduling rules, and a historical decision database.

26 Claims, 7 Drawing Sheets

| Scheduling Classification | Decision Level | Decision | Freq |
|---|---|---|---|
| Tight deadlines | 1 | not require_cert_1 | 103 |
| | | allow_overtime | 67 |
| | | ... | ... |
| | 2 | require_cert_1 | 32 |
| | | allow_overtime | 89 |
| | | require_cert_2 | 25 |
| | ... | ... | ... |
| | | not require_cert_1 | 10 |
| | ... | ... | ... |
| | 23 | allow_unreliable_presses | 120 |
| | | outsource_binding | 97 |
| | | ... | ... |
| | | not require_cert_2 | 42 |

| Scheduling Classification | Decision Level | Decision | Freq |
|---|---|---|---|
| High-quality jobs | 1 | require_cert_1 | 210 |
| | | allow_overtime | 120 |
| | | ... | 20 |
| | | not require_cert_2 | 109 |
| | 2 | require_cert_2 | 73 |
| | | not outsource_binding | ... |
| | | ... | 14 |
| | | not require_cert_2 | ... |
| | 18 | not allow_unreliable_presses | 87 |
| | | not outsource_binding | 45 |
| | | ... | |
| | | not require_cert_2 | 19 |

JOB SCHEDULE GENERATION USING HISTORICAL DECISION DATABASE

CROSS-REFERENCE TO RELATED APPLICATIONS

Reference is made to commonly assigned, co-pending U.S. patent application Publication No. 2010/0225954, entitled: "Job schedule generation", by Balduccini, which is incorporated herein by reference.

FIELD OF THE INVENTION

This invention relates to generating job schedules by solving job scheduling problems, and more particularly to a method for determining a print job schedule for a printing production facility.

BACKGROUND OF THE INVENTION

Solving job scheduling problems is a difficult task for humans because of the number of alternatives that must be considered in the search for a solution. Various programming techniques have been devised to use computers to solve scheduling problems. Most of these techniques work well when the problem is relatively simple (e.g., when the jobs can be processed by any of the devices available). However, when the problem becomes more complex, traditional programming techniques lose their effectiveness. In particular, generating job schedules for printing workflows is complex because such workflows include a number of constraints, such that certain jobs can be processed only by particular devices at particular times, some jobs must be processed before others, and users may prefer solutions of a certain kind over others. Conventional techniques, such as C, C++, or Java programming, require complex programs, which are difficult and time-consuming to write, debug, and maintain, due to their relatively low level of abstraction.

In recent years, powerful declarative languages have been designed that allow solving industrial-size problems by programming at a higher level of abstraction. Programmers using such declarative languages essentially describe the problems and the properties of the desired solutions, and let general-purpose programs, called solvers, find the solutions satisfying the given constraints. It is important to stress that the programmer no longer specifies how to compute the solution. Rather, the solver, when executed by a data processing system, takes care of that.

Most declarative languages have thus far been focused on either quantitative problems (e.g. finding solutions to sets of sophisticated equations) or qualitative problems (e.g. determining how to perform discrete actions on a physical system, such as an electrical circuit, to obtain a certain macroscopic effect, such as lighting certain bulbs), but not both. Among the most promising programming methodologies are the constraint satisfaction paradigm, which allows describing equations and inequalities among variables of interest, and the Answer Set Programming (ASP) paradigm, which describes properties of objects and the relations among them using a simple logical language.

The basic definition of the syntax and semantics of the language of ASP states that an ASP program or answer set program is a set of rules, a rule being a statement of the form:

$$H \leftarrow L_1, \ldots, L_m, \text{not } L_{m+1}, \ldots, \text{not } L_n \quad (1)$$

where H and $L_i$ are first order literals, and "not" is the so-called default negation operator, which is well-known known in the art. For more details, see the definitions provided by Michael Gelfond and Vladimir Lifschitz in the article "Classical negation in logic programs and disjunctive databases" (New Generation Computing, Vol. 9, pp. 365-385, 1991). Most solvers for ASP are based on the Davis-Putnam-Logemann-Loveland (DPLL) algorithm described by M. Davis and H. Putnam in the article "A computing procedure for quantification theory" (Communications of the ACM, Vol. 7, pp. 201-215, 1960); and by M. Davis, G. Logemann, and D. Loveland in the article "A machine program for theorem proving" (Communications of the ACM, Vol. 5, pp., 394-397, 1962). For simplicity, we refer to these solvers by the term "DPLL-type solvers". Among the DPLL-type solvers for ASP, one of the most powerful is the SMODELS solver described by P. Simons, I. Niemela and T. Soininen in the article "Extending and implementing the stable model semantics" (Artificial Intelligence, Vol. 138, pp. 181-234, 2002).

Of the programming methodologies mentioned above, constraint satisfaction has been shown to provide elegant solutions to industrial-size problems whose nature is mostly quantitative, whereas ASP has been used to solve industrial-size problems whose nature is mostly qualitative. However, certain complex scheduling problems, such as those for the printing workflow, involve both quantitative aspects (e.g. the start times of execution of the jobs) and qualitative aspects (e.g. required order of execution among jobs, preferences for solutions having certain properties). For this reason, scheduling problems of this kind can be tackled by combining answer set programming and constraint satisfaction.

Notice that, in this case, the performance of the overall system depends on the performance of both the constraint solver and of the ASP solver used. Unfortunately, although ASP solvers have improved significantly over the last two decades, their performance is still rather unstable. ASP solvers can often solve a problem in a matter of seconds, but may take hours or days to solve a slightly different problem of similar difficulty. This instability is problematic for industrial applications, where users typically expect consistent performance.

Consequently, a need exists for a method of solving scheduling problems in general, and those related to the printing workflow, using ASP solvers that ensures a consistent, reliable performance.

SUMMARY OF THE INVENTION

The present invention represents a method for determining a print job schedule for a printing production facility having a set of availably printing resources, comprising:
  defining one or more scheduling classifications;
  receiving one or more print jobs, each print job having a print job description specified by a set of print job attributes;
  determining one or more scheduling classification corresponding to the received print jobs;
  using a processor to automatically determine the print job schedule for the received print jobs using an answer set programming language solver responsive to:
    the print job descriptions;
    a set of resource descriptions for the available printing resources;
    a set of scheduling rules; and
    a historical decision database stored in a processor accessible memory, wherein the historical decision database stores an indication of previously successful decision frequencies as a function of scheduling classification;

wherein the print job schedule assigns a time schedule and one or more printing resources for each of the received print jobs.

The present invention has the advantage that using a historical decision database enables the answer set programming language solver to determine the print job schedule more quickly and with more consistent performance.

It has the additional advantage that the historical decision database can be customized to the characteristics of a particular printing production facility, and can be updated to adapt to the distribution of print jobs that are produced.

It has the further advantage that it can be used to update previously determined print job schedules as new print jobs are added or circumstances change.

DETAILED DESCRIPTION OF THE INVENTION

In the following description, embodiments of the present invention often are described as a software program. Those skilled in the art will readily recognize that the equivalent of such software may also be constructed in hardware or firmware. Given the method and system as described according to the invention in the following, software not specifically shown, suggested, or described herein that is useful for implementation of the invention is conventional and within the ordinary skill in such arts.

Figure 1:
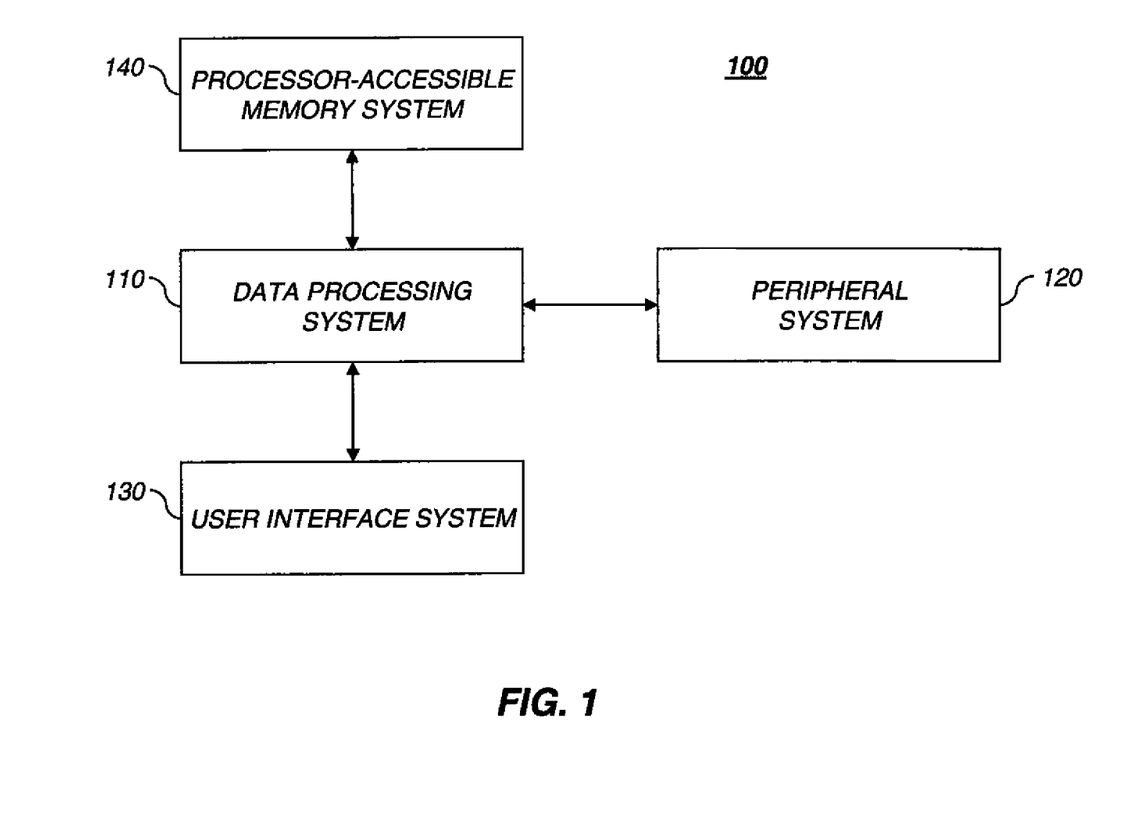
FIG. 1 illustrates a data processing system and its interfacing components, according to an embodiment of the present invention.

FIG. 1 illustrates a system 100 for implementing the various embodiments of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

The data processing system 110 includes one or more data processing devices that implement the processes of the various embodiments of the present invention. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

Figure 2:
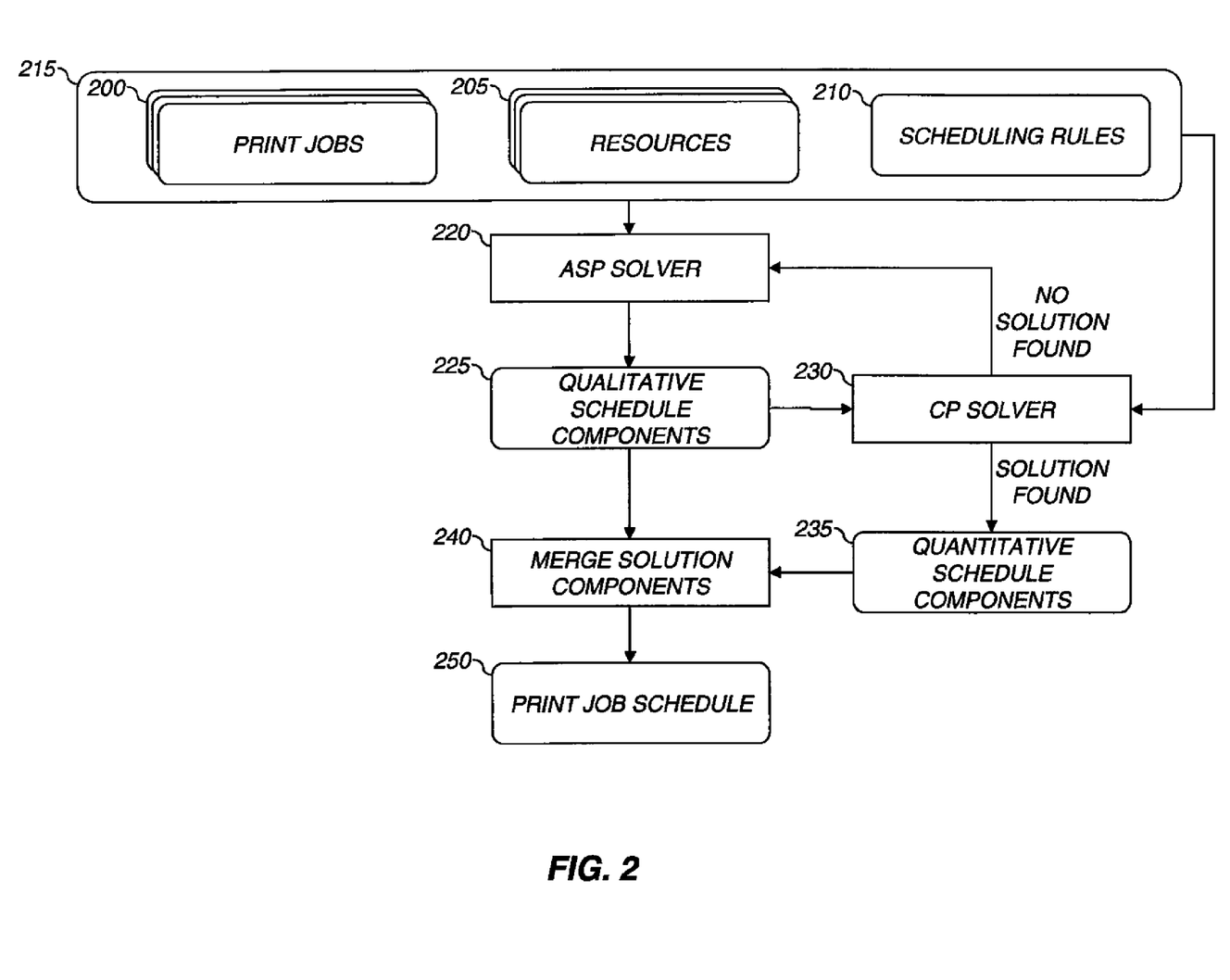
FIG. 2 illustrates a flowchart of a method for finding a schedule for a given printing scheduling problem.

The processor-accessible memory system 140 includes one or more processor-accessible memories configured to store information, including the information needed to execute the processes of the various embodiments of the present invention, including the example process of FIG. 2 described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 1.

Commonly-assigned, co-pending U.S. patent application Ser. No. 12/396,640 by M. Balduccini entitled "Job schedule generation" teaches how declarative languages dedicated to quantitative problems (e.g. finding solutions to sets of sophisticated equations) can be combined with declarative languages dedicated to qualitative problems (e.g. determining how to perform discrete actions on a physical system, such as an electrical circuit, to obtain a certain macroscopic effect, such as lighting certain bulbs), in order to solve scheduling problems in a printing workflow. More specifically, the languages combined are the Constraint Programming (CP) language, which allows describing equations and inequalities among variables of interest, and the Answer Set Programming (ASP) language, which allows describing the properties of objects and the relations among them using simple but powerful constructs.

FIG. 2 illustrates a flowchart of a method for determining a print job schedule 250 for a given printing workflow scheduling problem 215 using the approach taught in the aforementioned U.S. patent application Ser. No. 12/396,640. The method is generally implemented using a data processor, such as the data processing system 110 of FIG. 1. The scheduling problem 215 is defined by a plurality of print jobs 200, which are to be printed using a plurality of available resources 205 according to a set of scheduling rules 210.

Each print job 200 includes a print job description specified by a set of print job attributes, which may include color characteristics, media type, page size, number of copies or finishing requirements. In a preferred embodiment, the scheduling rules 210 are provided as a set of ASP statements (sometimes referred to as ASP rules). For more information on ASP statements, see the aforementioned article by Gelfond et al.

The resources 205 would include all of the different devices, materials and operators used in the printing process. The devices would include printing devices (e.g., printing presses) and finishing devices (e.g., folding and binding machines). Materials would include inks, receivers and binding supplies. Operators would include technicians responsible for setting up and running the various printing and finishing devices.

The resources 205 are characterized by resource descriptions. For example, the resource descriptions for a particular printing device can include attributes such as color printing capabilities, print quality capabilities, media capabilities, throughput capabilities, operational cost or setup time/complexity. Likewise, the resource descriptions for a particular finishing resource may include finishing format capabilities, media capabilities, throughput capabilities, operational cost or setup time/complexity. The resource descriptions for a particular consumable materials resource (e.g., ink or paper sheets) may include physical materials attributes or cost. The resource descriptions for a particular operator resource (such as a press technician or a finishing technician) may include certifications obtained, amount of overtime worked or statistics of past performance.

The scheduling rules 210 specify logical links between print job attributes and decisions, such as "if j1 is a high-quality job, then all involved operators must have obtained certification c2." An important set of scheduling rules also defines constraints on the order of execution of the operations, such as "do not start the finishing phase until all the required parts of the job have been printed."

An ASP solver 220 is used to solve the qualitative aspects of the scheduling problem 215, producing qualitative schedule components 225. Preferably, the ASP solver 220 uses off-the-shelf DPLL-type ASP software components. The qualitative aspects of the scheduling problem 215 would include aspects such as deciding which printing presses and finishing equipment should be used for which print jobs 200; deciding whether particular print jobs 200 should be assigned to operators who have obtained a certain certification, and deciding whether overtime work should be avoided.

The qualitative schedule components 225 are encoded by an answer set (i.e., a set of logical statements representing a solution for the qualitative aspects of the scheduling problem 215). For more information on answer set semantics, see the aforementioned article by Gelfond et al. It is worth noting that, according to the answer set semantics, a set of ASP statements (called an ASP program) may have multiple answer sets. As is well-known in the art, the execution of a DPLL-type ASP solver is an instance of a so-called "depth-first search."

A CP solver 230 is then used to search for a solution for the quantitative aspects of the scheduling problem 215 subject to the constraints imposed by the qualitative schedule components 225, producing quantitative schedule components 235. In a preferred embodiment, the CP solver 230 uses off-the-shelf CP software components. The quantitative aspects of the scheduling problem 215 would include aspects such as determining at what time the execution of each job is going to start and computing the setup cost for a job given the features of the job that precedes it on the same press. In some cases, the qualitative schedule components 225 may constrain the problem such that the CP solver 230 may not be able to find a valid solution. If the CP solver 230 is not able to find a valid solution, the ASP solver 220 is used to determine an alternate solution to the qualitative aspects of the scheduling problem 215.

When valid qualitative schedule components 225 and quantitative schedule components 235 have been found, a merge solution components step 240 is used to extract a print job schedule 250 by merging the qualitative schedule components 225 and quantitative schedule components 235. In a preferred embodiment, the merge solution components step 240 formats the print job schedule in a human-readable tabular or graphical format showing start/end times, and resources assigned to each print job 200, and translates logical statements such as "require_certification(j1,c2)" into corresponding English statements such as "Operators with certification c2 must be assigned to job j1."

Figure 3:
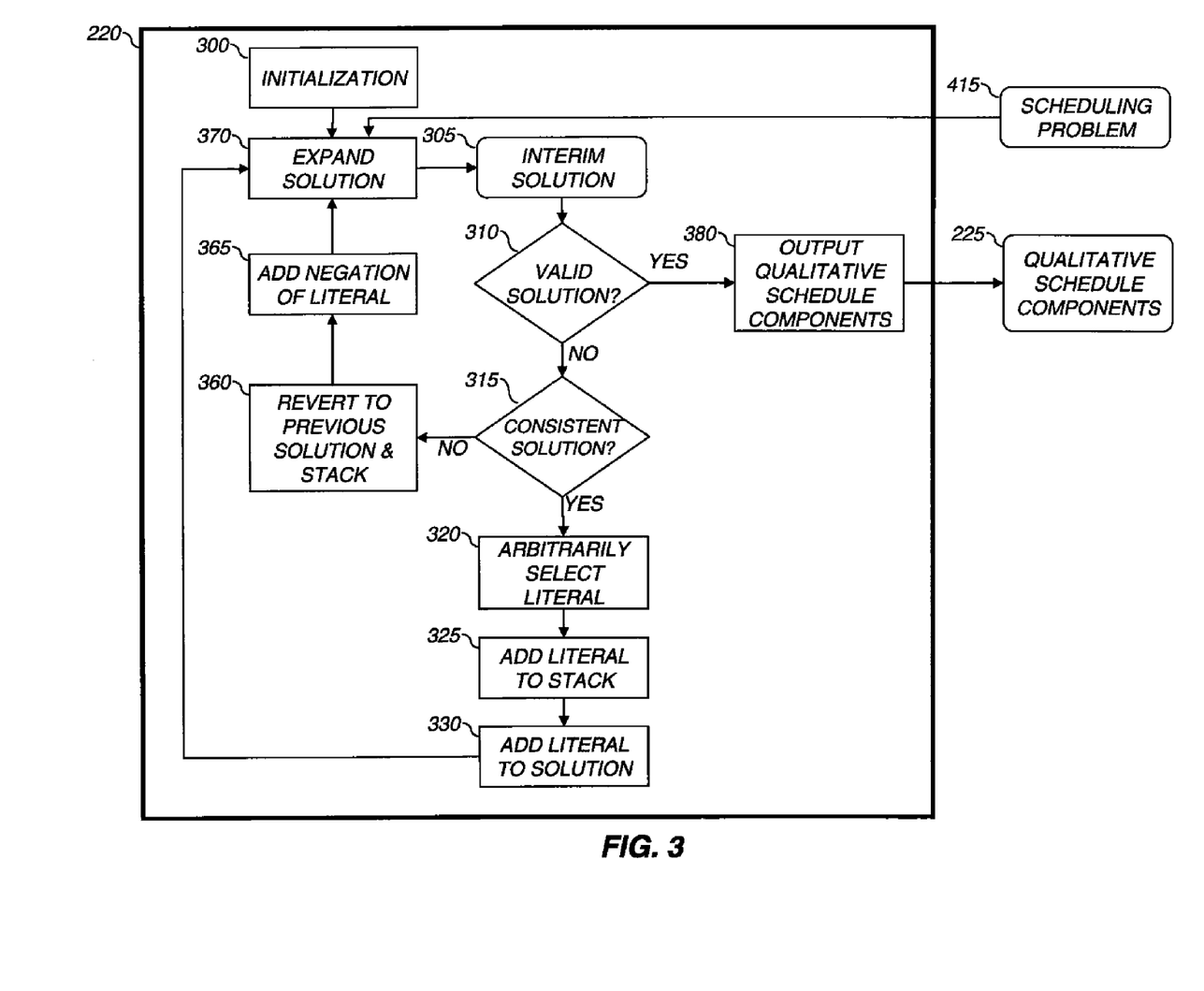
FIG. 3 illustrates a flowchart of a method for determining qualitative schedule components using an ASP solver.

FIG. 3 is a flow chart illustrating the operation of a typical ASP solver 220, which can be used in accordance with the method of FIG. 2. Those skilled in the art will readily recognize that the flow chart is applicable for DPLL-type ASP solvers, as well as the SMODELS solver and their derivatives.

In the description of the FIG. 3 process, the following terminology is used. The term "atom" refers to a logical statement, such as "press p1 is malfunctioning," or "operator of does not have certification c2." Atoms will often be denoted by letter "A" (sometimes indexed by a subscript). The term "literal" refers to an atom A or the expression "not A," which intuitively means that there is no reason to believe that A is true. A literal will often be denoted by letter "L" (sometimes indexed by a subscript). It is worth stressing the difference between the meaning of "not A" and simply saying that "A is false." One may have no reason to believe that A is true, but at the same time may not have enough information to believe it false either. For example, one may have no reason to believe that press p1 is malfunctioning, but until the press is carefully tested, there is not enough information to state that p1 is definitely not malfunctioning. Given a literal "not A," the expression "not(not A)" denotes "A." Given an atom A, the expression "not(A)" denotes the literal "not A."

The data processing system 110 (FIG. 1), when executing the process illustrated by FIG. 3, takes as input the scheduling problem 215 (P), which is stored in the processor-accessible memory system 140. The processor-accessible memory system 140 is also used to store an interim solution I comprising a set of statements corresponding to the current trial solution being tested, as well as a stack S storing choice-point information. In some alternate embodiments, the processor-accessible memory system 140 also stores a set of previously tested statements T, which is used to record the statements that have been evaluated. An initialization step 300 initializes the interim solution I to be an empty set, and also initializes the stack S to an empty stack, respectively.

An expand solution step 370 updates I to provide an updated interim solution 305 by adding to it all the literals that are entailed by I and scheduling problem 215. A valid solution test 310 checks whether the interim solution 305 represents an answer set of the scheduling problem 215. In a preferred embodiment, the valid solution test 310 checks for a valid solution according to the definition of an answer set given in the aforementioned article by Gelfond et al.

If the valid solution test 310 determines that the interim solution 305 is a valid answer set, then an output qualitative schedule components step 380 is used to output the qualitative schedule components 225, comprising the interim solution 305 together with the sequence of literals contained in the stack S, and the process terminates.

If the valid solution test 310 determines that the interim solution 305 is not an answer set, a consistent solution test 315 checks whether the interim solution 305 is inconsistent, that is, whether two complementary atoms, such as "p1 is malfunctioning" and "p1 is not malfunctioning" are contained in the interim solution 305. If no inconsistency is detected, an arbitrarily select literal step 320 is used to select a literal L such that neither L nor not L belong to the interim solution 305.

The arbitrarily select literal step 320 is sometimes referred to as a "choice point." The selection process used by the arbitrarily select literal step 320 follows the methods defined for DPLL-type solvers or for the SMODELS solver, both known to those skilled in the art. The sequence of choice points traversed until an inconsistency is detected or an answer set is found is called a "search branch." The set of all possible search branches is often referred to in the literature as a "search tree" or a "decision tree." Because the size of the search tree involved in solving scheduling problems, a solver will often explore a large number of search branches, backtracking at the end of each search branch, before finding a search branch that leads to a valid answer set.

To improve performance, heuristics can be used to guide the arbitrary selection process, in order to guide the solution towards the most promising parts of the search tree. However, the heuristics may be fooled by particular features of the problem, and lead the ASP solver 220 in the wrong direction. When that happens, the performance of the ASP solver 220 can be degraded substantially—in some cases going from returning a solution in seconds to taking hours or days.

An add literal to stack step 325 is used to add the pair <L, I> to the stack S. (In some embodiments, the literal L is also added to the set of previously tested statements T.) An add literal to solution step 330 is then used to add the literal L to I (the interim solution 305), and the process returns to the expand solution step 370.

If the consistent solution test 315 determines that the interim solution 305 contains an inconsistency, then a revert to previous solution and stack step 360 is used to revert to the previous interim solution. This is done by replacing the contents of I with the value from the <L, I> pair on the top of the stack S, and then removing the most recently added <L, I> pair from the stack S. An add negation of literal step 365 is then used to add "not(L)" to I, and the process returns to the expand solution step 370.

The smooth execution of the scheduler shown in FIG. 2 depends on the consistency of performance of the ASP solver 220. Although ASP solvers 220 have improved significantly over the last two decades, their performance is still rather unstable. The ASP solver 220 can often solve a problem in a matter of seconds, but may take hours or days to solve a slightly different problem of similar difficulty. This instability is problematic for industrial applications, where users typically expect consistent performance.

Figure 4:
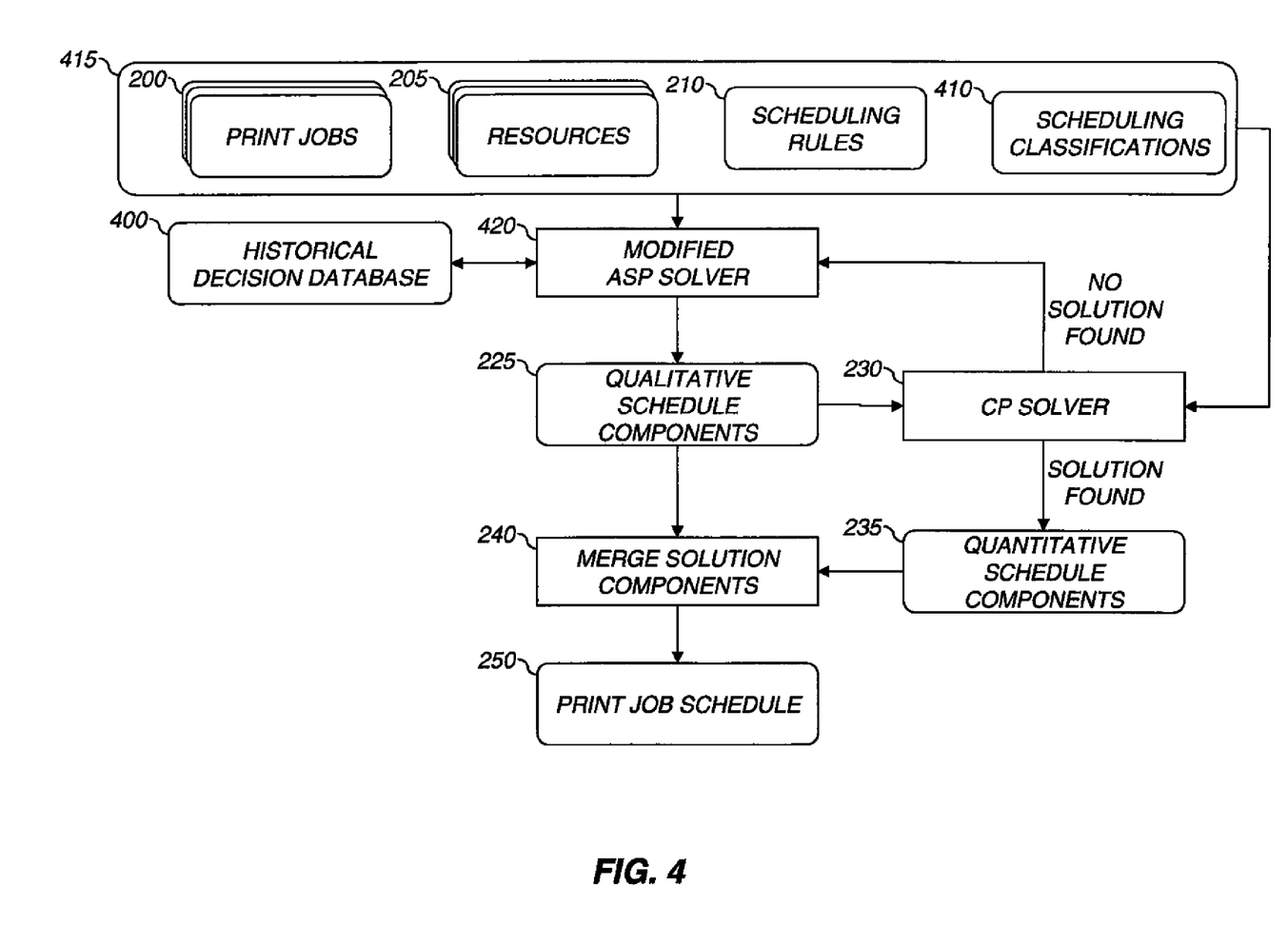
FIG. 4 illustrates a flowchart of a method for finding a schedule for a given printing scheduling problem using an historical decision database according to an embodiment of the present invention.

FIG. 4 illustrates a flowchart of an improved method for determining a print job schedule 250 aimed at providing improved performance relative to the method discussed with respect to FIG. 2. This approach curbs the performance degradations associated with the instability of the ASP solver 220 by using an historical decision database 400. The input to this method is a scheduling problem 415, which is identical to the scheduling problem 215 of FIG. 2, except that it also includes one or more scheduling classifications 410 corresponding to the print jobs 200. The scheduling classifications 410 can be defined by specifying domains of print job attributes. For a particular scheduling problem 415, one or more appropriate scheduling classification 410 can be determined by comparing the print job attributes to the domains of print job attributes. In some embodiments, the scheduling classifications 410 can be automatically determined by analyzing the attributes of the print jobs 200 and resources 205. Those skilled in the art will promptly see that this automatic analysis can also be based on the characteristics of previously received scheduling problems. In other embodiments, the scheduling classifications 410 can be manually specified by the user.

In a preferred embodiment, one or more scheduling classifications are predefined corresponding to the types of scheduling problems that are commonly encountered. In some embodiments, all of the types of scheduling problems can be included in a single implicit scheduling classification.

In some embodiments, the scheduling classifications 410 can be group classifications that are used to classify groups of print jobs (e.g., the entire scheduling problem 415). For example, a scheduling classification labeled "no overtime" can be assigned to scheduling problems when the use of overtime for the operators should be discouraged. In other embodiments, scheduling classifications 410 can be print job classifications that are used to classify individual print jobs. For example, a print job can be classified as "color" or "rush." The print job classifications can be determined by automatically analyzing the print job description for the print jobs 200, or alternatively can be manually specified by the user. In some embodiments, more than one scheduling classification 410 can be assigned to a single scheduling problem 415 or print job 200. For example, a particular print job 200 can be classified as both "color" and "rush."

The historical decision database 400 is stored in processor-accessible memory system 140 (FIG. 1), and stores an indication of previously successful decision frequencies as a function of scheduling classification 410. The historical decision database 400 is used to guide a modified ASP solver 420 to explore the search branches that have produced valid solutions. Preferably, the historical decision database 400 is customized according to the scheduling problems 415 encountered by a particular print shop. In other embodiments, the same historical decision database 400 can be provided to a plurality of print shops.

According to some embodiments, the historical database is updated each time the method of FIG. 4 is used to determine a valid print job schedule 250. In other embodiments, the historical database is formed once, based on a population of previously successful decisions, or is updated at certain points in time.

The motivation for the use of the historical decision database 400 in the method of FIG. 4 is that, in a particular domain such as a given print shop, and for a given scheduling classification 410, the search trees that the modified ASP solver 420 is faced with for various scheduling problems 415 sharing the same scheduling classification 410 are likely to bear many similarities. Thus, successful choices that were taken by the modified ASP solver 420 while solving a previous scheduling problem P1 are likely to be useful to guide the modified ASP solver 420 towards a valid answer set for a second scheduling problem, P2, which has a similar scheduling classification 410.

Figure 5:
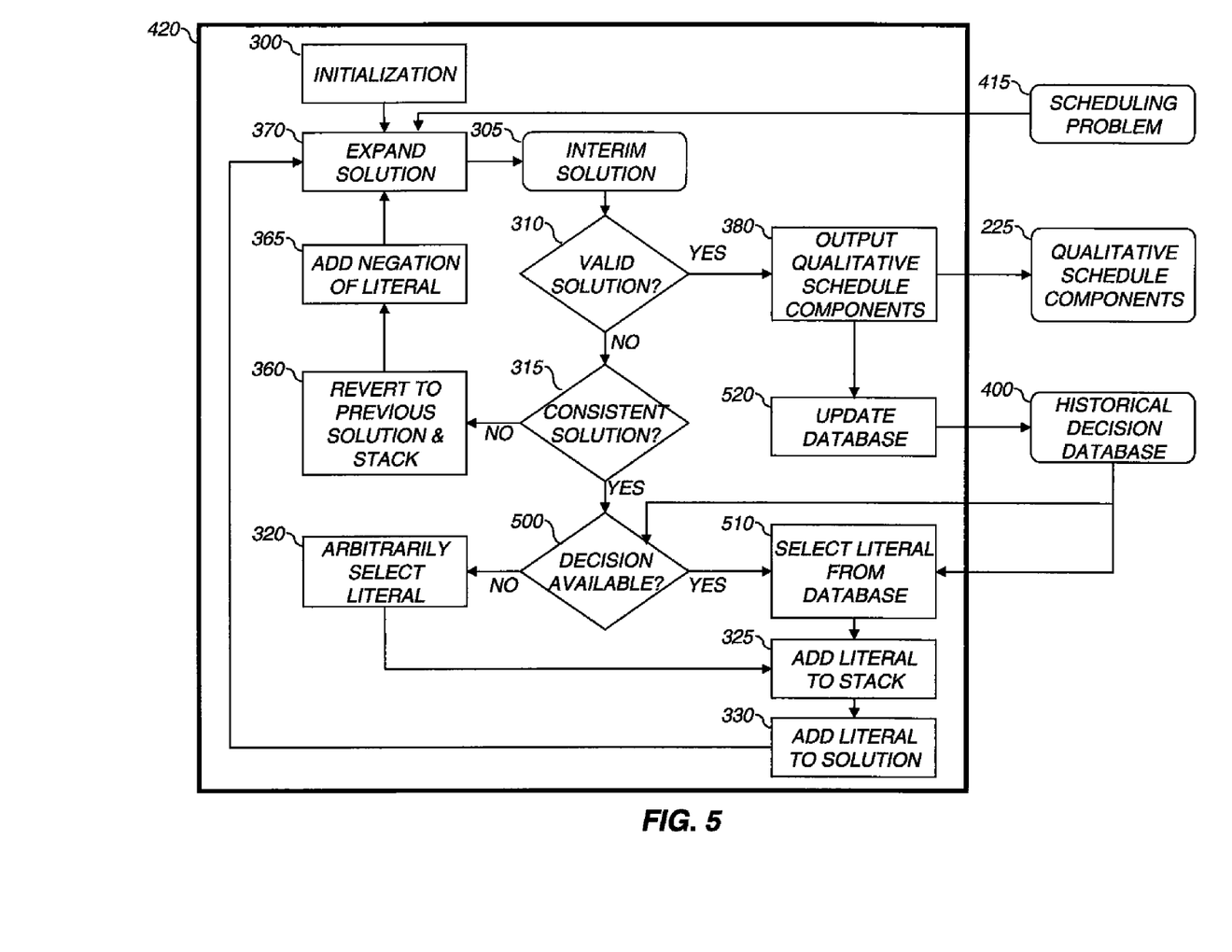
FIG. 5 illustrates a flowchart of a method for determining qualitative schedule components using an ASP solver and an historical decision database according to an embodiment of the present invention.

FIG. 5 illustrates a flowchart showing additional details for the modified ASP solver 420 shown in FIG. 4, according to an embodiment of the present invention where the choice-point selection strategy (also called search strategy) is adjusted responsive to the historical decision database. The modified ASP solver 420 represents a modification of the ASP solver 220 shown in FIG. 3; identical reference numbers where appropriate to indicate identical (or analogous) elements. The principle difference is the addition of a decision available test 500 and a select literal from database step 510.

The decision available test 500 checks whether the historical decision database 400 contains information suitable for guiding the decision at the current choice-point. In a preferred embodiment, the scheduling classification 410 (FIG. 4) is used to identify decisions in the historical decision database 400 that have been successfully taken for scheduling problems having the same (or similar) scheduling classification 410. Preferably, the historical decision database is searched for successful decisions which were made at a level in the search tree (also called decision level) that is within a certain distance from the current decision level.

If the decision available test 500 determines that a suitable decision is available, then the select literal from database step 510 selects an appropriate literal L from the historical decision database 400. In a preferred embodiment, the select literal from database step 510 preferentially selects literals corresponding to decisions having higher previously successful decision frequencies. In a preferred embodiment, the selected literal L should be one that is not included in the set of previously tested statements T. The process then proceeds to the add literal to stack step 325. On the other hand, if no suitable decision is available, the arbitrarily select literal step 320 is used to select the literal L. The validity and consistency of the trial decision associated with the literal L is then evaluated as in the method shown in FIG. 3. The process proceeds iteratively until a valid solution is found.

When a valid solution is identified using the valid solution test 310, the output qualitative schedule components step 380 outputs the corresponding qualitative schedule components 225 as before. Additionally, an update database step 520 is used to update the historical decision database 400 to include the successful decisions associated with the valid solution.

Although the method described in FIG. 5 is based on the processing performed by DPLL-type solvers, those skilled in the art will readily see that the same method also applies to the SMODELS solver and solvers derived from it.

The data processing system 110 (FIG. 1), when executing the process illustrated by FIG. 5, takes as input the scheduling problem 415, including the scheduling classification 410 (FIG. 3) and the historical decision database 400, which are stored in processor-accessible memory system 140. During the execution of the method the processor-accessible memory system 140 is also used to store the interim solution I, the set of previously tested statements T, and the stack S of choice-point information. When the method is complete, the resulting qualitative schedule components 225 corresponding to the valid solution will also be stored in the processor-accessible memory system 140 so as to be available for the other steps in the method of FIG. 4.

Figure 6A:
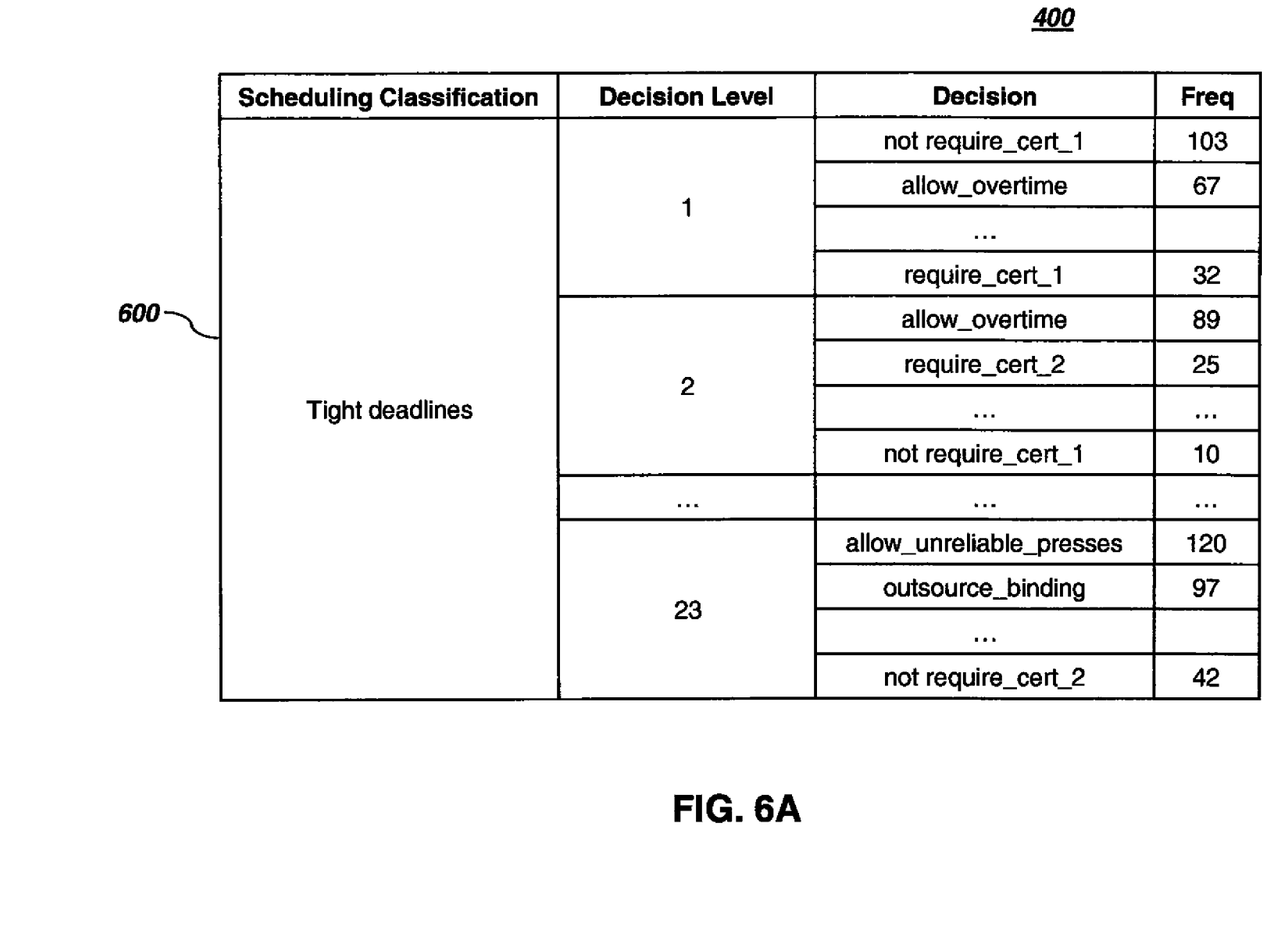
FIGS. 6A and 6B illustrate portions of an exemplary historical decision database.
Figure 6B:
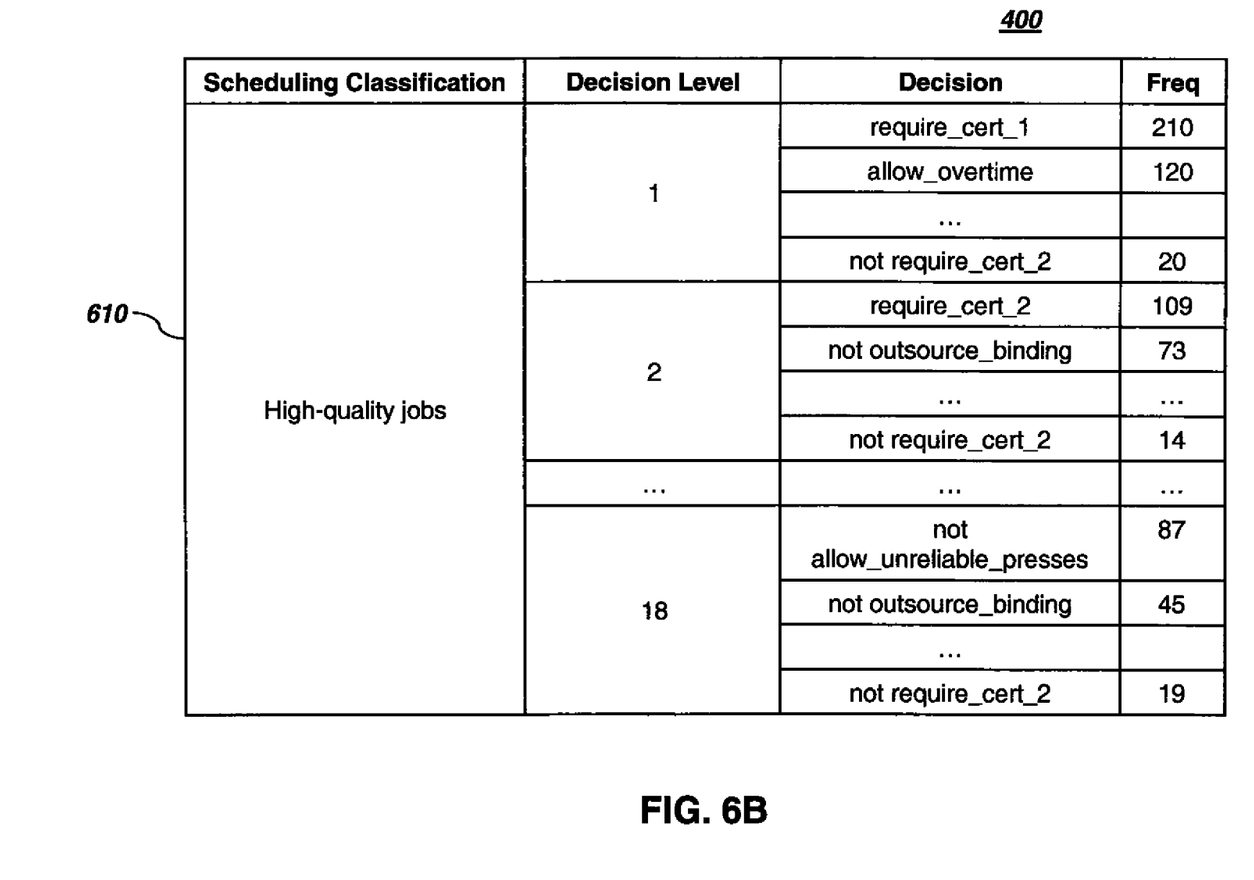

FIGS. 6A and 6B illustrate portions of a historical decision database 400 according to an embodiment of the present invention. In this example, the historical decision database 400 contains data corresponding to two different scheduling classifications. FIG. 6A shows a first database portion 600 corresponding to a "tight deadlines" scheduling classification, and FIG. 6A shows a second database portion 610 corresponding to a "high-quality jobs" scheduling portion. It will be obvious to one skilled in the art that the historical decision database can include data for any number of different scheduling classifications according to the requirements of any particular application. It should be noted that only a portion of the historical database entries have been shown for illustration purposes; ellipses have been used to indicate where rows of the historical decision database have been omitted.

In this embodiment, the historical decision database 400 stores an indication of previously successful decision frequencies for each scheduling classification as a function of decision level. In this example, the previously successful decision frequencies are represented as a number of previously successful decisions. This method has the advantage that the historical decision database 400 can be conveniently updated as valid solutions are found by simply incrementing the number of previously successful decisions. Preferably, the select literal from database step 510 (FIG. 5) preferentially selects literals having the highest number of previously successful decisions for the current decision level. If that decision proves to be unsuccessful, the decision with the next highest number of previously successful decisions is selected next, and so on.

In other embodiments the previously successful decision frequencies can be encoded in the historical decision database 400 using different schemes. For example, the previously successful decision frequencies can be represented as a probability of a decision being successful, which can be obtained, as those skilled in the art will promptly see, by normalizing the number of previously successful decisions. Alternatively, the historical decision database 400 can store an ordered list of decisions ranked according to their relative frequencies.

In yet another embodiment, the indication of previously successful decision frequencies can be stored as a neural network trained using a distribution of previously successful decisions. In this case, the neural network can be constructed having as input an indication of the print job classification and the current decision level, and having as output the literal to be selected. Given a suitable number of units in the hidden layers of the neural network and connections among them (the exact number and connections will depend on the features of the printing workflow scheduling problems being considered), information about previously successful decision frequencies by training the network, that is by adjusting the weights on the arcs that connect the units that compose the neural network's layers. The adjustment can be obtained by means of back-propagation, or by any other of the techniques known in the art.

It will be recognized by one skilled in the basic art that the method shown in FIG. 4 can be used to update a print job schedule 250 if the conditions change. For example, it may become necessary to add new print jobs 200, or the available resources 205 may change (e.g., an operator may be sick or a particular printing press may be down for repairs). In this case, the existing print job schedule 250 can be used to form the basis of a new scheduling problem 415. Any new print jobs 200 can then be added to the scheduling problem 415 and any other aspects of the scheduling problem 415 (e.g., the resources 205) can be modified as appropriate. The method can then be re-executed to determine an updated print job schedule 250.

The original print job schedule 250 can provide an initial guess at a solution to the scheduling problem 415, particularly for the aspects of the scheduling problem 415 that have not changed. However, it will frequently be necessary to modify the time schedule or the printing resources assigned for at least one previously scheduled print job. As those skilled in the art will promptly see, that can be accomplished by automatically or manually assigning a degree of preference for making changes to the previously scheduled print jobs (e.g. it may be preferable to change print jobs that are far from being started, relative to print jobs that are starting soon, as gathering of resources such as delivery of paper sheets for such print jobs may have already started), and then constructing the scheduling problem 415 in such a way as to respect such preferences.

The performance and reliability improvement obtained by adopting the FIG. 4 method in place of the FIG. 2 method have been assessed experimentally. In order to increase the breadth and scientific value of our assessment, and to isolate the improvement due to the adoption of the FIG. 4 method, well-established benchmarks from the literature were used, which did not require the use of a CP solver. One of them was the 15-puzzle problem from the Second ASP Competition (see M. Denecker et al., "The Second Answer Set Programming Competition," Proceedings of the 10th International Conference on Logic Programming and Nonmonotonic Reasoning, pp. 637-654, 2009). Another was the Reaction Control System of the Space Shuttle domain (see M. Balduccini et al., "Answer Set Based Design of Knowledge Systems," Annals of Mathematics and Artificial Intelligence, Vol. 47, pp. 183-219, 2006).

The ASP solvers corresponding to the methods from FIG. 2 and FIG. 4 were used to run the benchmarks, and then their performance was compared. For the 15-puzzle problem, an average speedup factor of 6.7× was obtained by using the FIG. 4 method vs. the FIG. 2. The highest speedup factor was 24×. More importantly, out of 11 instances for which the FIG. 2 method timed out after 2,000 seconds (selected as the maximum acceptable wait time for a user), all were solved within the time limit by the FIG. 4 method. This confirms that the use of the FIG. 4 method provides a solver with a more consistent performance. For the Reaction Control System of the Space Shuttle benchmark, we ran our experiments with a timeout of 6,000 seconds (we chose a higher limit than the one mentioned earlier, considering that the problem itself is more complex and a user is likely to accept to wait longer). The average speedup factor obtained by using the FIG. 4 method vs. the FIG. 2 method was of 259× times, with a peak of 1253× for an instance for which the FIG. 2 method timed out, and a peak of 544× for an instance for which the FIG. 2 method did not time out. More importantly, out of 53 instances for which the FIG. 2 method timed out before finding a solution, 48 of those instances were solved by the FIG. 4 method within the time limit, and in some cases in under 10 seconds. Once again, this confirmed the expectation that the use of the FIG. 4 method provides a solver with a more consistent performance. Inventors testing shows that similar performance improvements are obtained when the FIG. 4 method is used to solve print job scheduling problems, although no publicly available benchmark datasets are available for testing.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

Parts List

100 System
110 Data processing system
120 Peripheral system
130 User interface system
140 Processor-accessible memory system
200 print jobs
205 resources
210 scheduling rules
215 scheduling problem
220 ASP solver
225 qualitative schedule components
230 CP solver
235 quantitative schedule components
240 merge solution components step
250 print job schedule
300 initialization step
305 interim solution
310 valid solution test
315 consistent solution test
320 arbitrarily select literal step
325 add literal to stack step
330 add literal to solution step
360 revert to previous solution and stack step
365 add negation of literal step
370 expand solution step
380 output qualitative schedule components step
400 historical decision database
410 scheduling classifications
415 scheduling problem
420 modified ASP solver
500 decision available test
510 select literal from database step
520 update database step
600 first database portion
610 second database portion

The invention claimed is:

1. A method for determining a print job schedule for a printing production facility having a set of availably printing resources, comprising:
   defining one or more scheduling classifications;
   receiving one or more print jobs, each print job having a print job description specified by a set of print job attributes;
   determining one or more scheduling classification corresponding to the received print jobs;
   using a processor to automatically determine the print job schedule for the received print jobs using an answer set programming language solver responsive to:
   the print job descriptions;
   a set of resource descriptions for the available printing resources;
   a set of scheduling rules, wherein the scheduling rules are answer set programming statements; and
   a historical decision database stored in a processor accessible memory, wherein the historical decision database stores an indication of previously successful decision frequencies as a function of scheduling classification;

wherein the print job schedule assigns a time schedule and one or more printing resources for each of the received print jobs.

2. The method of claim 1 wherein the scheduling classifications include one or more print job classifications that are used to classify individual print jobs.

3. The method of claim 2 wherein at least one print job classification for at least one individual print job is automatically determined responsive to the corresponding print job description.

4. The method of claim 3 further including specifying domains of print job attributes associated with print job classifications, and wherein the print job classification for at least one print job is determined by comparing the print job attributes for the print job to the domains of print job attributes.

5. The method of claim 1 wherein the scheduling classifications include one or more group classifications that are used to classify a group of print jobs.

6. The method of claim 1 wherein the scheduling classifications include one or more manually user specified scheduling classifications.

7. The method of claim 1 wherein the scheduling classifications include one or more scheduling classifications that are determined by automatically analyzing the capabilities of the available printing resources.

8. The method of claim 1 wherein the historical database is updated responsive to the determined print job schedule.

9. The method of claim 1 wherein the print job schedule is updated as new print jobs are received to produce an updated print job schedule.

10. The method of claim 9 wherein the time schedule or the printing resources assigned for at least one previously scheduled print job are modified for the updated print job schedule.

11. The method of claim 1 wherein the print job attributes include color characteristics, media type, page size, number of copies or finishing requirements.

12. The method of claim 1 wherein the answer set programming language solver is a DPLL-type solver.

13. The method of claim 12 wherein the DPLL-type solver is an SMODELS solver.

14. The method of claim 1 wherein the answer set programming language solver utilizes a search strategy to search a decision tree, and wherein the search strategy is adjusted responsive to the historical decision database.

15. The method of claim 14 wherein the adjusted search strategy includes preferentially evaluating decisions having higher previously successful decision frequencies.

16. The method of claim 1 wherein the historical decision database stores an indication of previously successful decision frequencies for a plurality of decision levels.

17. The method of claim 1 wherein the indication of previously successful decision frequencies is stored as a number of previously successful decisions.

18. The method of claim 1 wherein the indication of previously successful decision frequencies is stored as a probability of a decision being successful.

19. The method of claim 1 wherein the indication of previously successful decision frequencies is stored as a neural network trained using a distribution of previously successful decisions.

20. The method of claim 1 wherein the printing resources include printing device resources, finishing resources, consumable materials resources, or operator resources.

21. The method of claim 20 wherein the set of resource descriptions for a particular printer device resource includes color printing capabilities, print quality capabilities, media capabilities, throughput capabilities, operational cost or setup time/complexity.

22. The method of claim 20 wherein the set of resource descriptions for a particular finishing resource includes finishing format capabilities, media capabilities, throughput capabilities, operational cost or setup time/complexity.

23. The method of claim 20 wherein the set of resource descriptions for a particular consumable materials resource includes physical materials attributes or cost.

24. The method of claim 20 wherein the set of resource descriptions for a particular operator resource includes certifications obtained, amount of overtime worked, or statistics of past performance.

25. The method of claim 1 wherein the scheduling rules include rules specifying required operator certifications or rules specifying required orders of operations.

26. The method of claim 1 further including printing the received print jobs according to the determined print job schedule using the available printing resources.

* * * * *